(12) United States Patent  (10) Patent No.: US 8,194,169 B2
Tamaki et al.  (45) Date of Patent: Jun. 5, 2012

(54) COMPOUND EYE CAMERA MODULE AND METHOD OF PRODUCING THE SAME

(75) Inventors: Satoshi Tamaki, Osaka (JP); Katsumi Imada, Nara (JP); Tatsutoshi Suenaga, Osaka (JP)

(73) Assignee: Panasonic Corporation, Osaka (JP)

( * ) Notice: Subject to any disclaimer, the term of this patent is extended or adjusted under 35 U.S.C. 154(b) by 1014 days.

(21) Appl. No.: 12/159,288

(22) PCT Filed: Jan. 12, 2007

(86) PCT No.: PCT/JP2007/050351
§ 371 (c)(1),
(2), (4) Date: Jun. 26, 2008

(87) PCT Pub. No.: WO2007/083579
PCT Pub. Date: Jul. 26, 2007

(65) Prior Publication Data
US 2010/0225755 A1  Sep. 9, 2010

(30) Foreign Application Priority Data
Jan. 20, 2006 (JP) ................. 2006-012819

(51) Int. Cl.
G02B 13/16 (2006.01)
G02B 21/00 (2006.01)
H04N 5/225 (2006.01)
H01L 27/00 (2006.01)

(52) U.S. Cl. ............. 348/335; 348/208.7; 348/360; 250/208.1; 359/381

(58) Field of Classification Search .......... 348/335, 348/208.7, 360; 250/208.1; 359/381
See application file for complete search history.

(56) References Cited

U.S. PATENT DOCUMENTS

| 4,307,940 | A | * | 12/1981 | Hagedorn-Olsen | 359/821 |
| 5,818,637 | A | * | 10/1998 | Hoover et al. | 359/381 |
| 6,072,620 | A | * | 6/2000 | Shiono et al. | 359/290 |
| 6,804,460 | B1 | * | 10/2004 | Oshima et al. | 396/74 |
| 6,833,873 | B1 | | 12/2004 | Suda | |

(Continued)

FOREIGN PATENT DOCUMENTS
JP  9-135010  5/1997
(Continued)

*Primary Examiner* — Ranodhi Serrao
(74) *Attorney, Agent, or Firm* — Hamre, Schumann, Mueller & Larson, P.C.

(57) ABSTRACT

An optical filter array (2) having a plurality of optical filters (2a to 2d) and a light shielding block (6) having light shielding walls (61a to 61d) forming a plurality of openings (6a to 6d) independent from each other are placed between a lens module (7) integrally having a plurality of lenses (1a to 1d) arranged on a single plane and a plurality of imaging regions (4a to 4d). The light shielding block is provided with first sliding surfaces (66 to 69). The lens module is provided with second sliding surfaces (56 to 59) sliding on the first sliding surfaces so that the lens module can rotate with respect to the light shielding block with an axis normal to the plurality of imaging regions as a rotation center axis. Thus, a small, thin, and low-cost compound eye camera module can be realized.

8 Claims, 9 Drawing Sheets

U.S. PATENT DOCUMENTS

| | | |
|---|---|---|
| 7,411,733 B2 | 8/2008 | Toyoda et al. |
| 7,453,056 B2 | 11/2008 | Toyoda et al. |
| 7,525,081 B2 | 4/2009 | Toyoda et al. |
| 7,865,076 B2 | 1/2011 | Tamaki et al. |
| 2002/0122124 A1 | 9/2002 | Suda |
| 2003/0048378 A1 | 3/2003 | Kim et al. |
| 2003/0086013 A1* | 5/2003 | Aratani .................. 348/335 |
| 2006/0023444 A1* | 2/2006 | Dallas et al. ............ 362/202 |
| 2006/0054782 A1* | 3/2006 | Olsen et al. ............. 250/208.1 |

FOREIGN PATENT DOCUMENTS

| | | |
|---|---|---|
| JP | 2001-78217 | 3/2001 |
| JP | 2002-171430 | 6/2002 |
| JP | 2003-143459 | 5/2003 |
| JP | 2005-109092 | 4/2005 |
| JP | 2006-080597 | 3/2006 |
| JP | 2006-246193 | 9/2006 |
| WO | 2007/125761 | 11/2011 |

* cited by examiner

COMPOUND EYE CAMERA MODULE AND METHOD OF PRODUCING THE SAME

TECHNICAL FIELD

The present invention relates to a small and thin camera module, and a method of producing the camera module. In particular, the present invention relates to a compound eye camera module that captures an image with a plurality of photographing optical lenses, and a method of producing the camera module.

BACKGROUND ART

In an imaging apparatus such as a digital video and a digital camera, a subject image is formed on an imaging element such as a CCD or a CMOS through a lens, whereby a subject is converted into two-dimensional image information. A camera module to be mounted on such an imaging apparatus is required to be small and thin.

In order to realize a small and thin camera module, a compound eye camera module has been proposed.

One example of the compound eye camera module is described in Patent Document 1, and will be described with reference to FIG. 13. A lens array 100 including three lenses 100a, 100b, and 100c and an imaging element 105 are placed so as to oppose each other. An optical filter array 102 having a green spectral filter 102a, a red spectral filter 102b, and a blue spectral filter 102c is provided on a surface of the lens array 100 on a subject side so that the green spectral filter 102a, the red spectral filter 102b, and the blue spectral filter 102c correspond to the three lenses 100a, 100b, and 100c, respectively. An optical filter array 103 having a green spectral filter 103a, a red spectral filter 103b, and a blue spectral filter 103c is provided also on a surface of the imaging element 105 on the lens array 100 side so that the green spectral filter 103a, the red spectral filter 103b, and the blue spectral filter 103c correspond to the three lenses 100a, 100b, and 100c, respectively. On the subject side of the optical filter array 102, a diaphragm member 107 having apertures (openings) at positions matched with optical axes of the lenses 100a, 100b, and 100c is placed. The lenses 100a, 100b, and 100c form subject images respectively on corresponding imaging regions on the imaging element 105. The wavelengths of light to be received by the lenses 100a, 100b, and 100c, respectively, are limited, so that they can form subject images on the imaging element 105 although they are single lenses. Thus, a camera module can be made thinner.

However, in the camera module, in order to prevent light having passed through a lens from being incident upon an imaging region not corresponding to the lens on the imaging element 105, the optical filter array 102 is provided between the diaphragm member 107 and the lens array 100, and furthermore, the optical filter array 103 is provided between the lens array 100 and the imaging element 105. Since a required optical length must be maintained between the lens array 100 and the imaging element 105, even if the optical filter array 103 is provided therebetween, the thickness of a lens module does not increase. However, when the optical filter array 102 is provided between the diaphragm member 107 and the lens array 100, the thickness of a camera module increases by the thickness of the optical filter array 102. More specifically, the camera module in FIG. 13 has a problem that thinning is insufficient.

A compound eye camera module solving the above problem is described in Patent Document 2, and will be described with reference to FIG. 14. A diaphragm member 111, a lens array 112, a light shielding block 113, an optical filter array 114, and an imaging element 116 are placed in this order from a subject side. The lens array 112 has a plurality of lenses. The diaphragm member 111 has apertures (openings) at positions matched with optical axes of the respective lenses of the lens array 112. The optical filter array 114 includes a plurality of optical filters having spectral characteristics that vary depending upon the region corresponding to each lens of the lens array 112, and covers a light receiving plane of the imaging element 116. The light shielding block 113 includes light shielding walls 113a at boundaries between adjacent lenses of the lens array 112, i.e., at positions matched with the boundaries between the adjacent optical filters of the optical filter array 114. The imaging element 116 is mounted on a semiconductor substrate 115. On the semiconductor substrate 115, a driving circuit 117 and a signal processing circuit 118 further are mounted.

According to the camera module, light having passed through a lens is prevented from being incident upon a filter of the optical filter array 114 not corresponding to the lens by the light shielding walls 113a of the light shielding block 113. Thus, the optical filter array 102 between the diaphragm member 107 and the lens array 100, which used to be required in the camera modules in FIG. 13, is not required. This enables the camera module to be thinned further.

Patent Document 1: JP 2001-78217 A
Patent Document 2: JP 2003-143459 A

DISCLOSURE OF INVENTION

Problem to be Solved by the Invention

However, the camera module in FIG. 14 has a problem in that the light shielding walls 113a of the light shielding block 113 may cover required imaging regions of the imaging element 116 due to the variation in assembly of the light shielding block 113 with respect to the lens array 112 in a direction parallel to a plane normal to an optical axis. Furthermore, if the imaging regions on the imaging element 116 are enlarged considering the variation, the number of pixels not used for actual imaging increases, enlarging the imaging element 116 and increasing a cost.

The present invention solves the above conventional problems, and its object is to provide a thin compound eye camera module that is small and entails low cost because of the small number of pixels of an imaging element to be wasted, and a method of producing the camera module.

Means for Solving Problem

A compound eye camera module of the present invention includes: a lens module integrally having a plurality of lenses arranged on a single plane; a plurality of imaging regions; an optical filter array placed between the lens module and the plurality of imaging regions and having a plurality of optical filters, each transmitting light in a particular wavelength band; and a light shielding block placed between the lens module and the plurality of imaging regions and having light shielding walls forming a plurality of openings independent from each other. The plurality of lenses, the plurality of imaging regions, the plurality of optical filters, and the plurality of openings correspond to each other in a one-to-one relationship.

A first sliding surface is provided on the light shielding block. Furthermore, a second sliding surface sliding on the first sliding surface is provided on the lens module so that the lens module is capable of rotating with respect to the light shielding block with an axis normal to the plurality of imaging regions as a rotation center axis.

Next, a method of producing a compound eye camera module of the present invention is a method of producing a compound eye camera module including a lens module integrally having a plurality of lenses arranged on a single plane, a plurality of imaging regions, an optical filter array placed between the lens module and the plurality of imaging regions and having a plurality of optical filters, each transmitting light in a particular wavelength band, and a light shielding block placed between the lens module and the plurality of imaging regions and having light shielding walls forming a plurality of openings independent from each other, the plurality of lenses, the plurality of imaging regions, the plurality of optical filters, and the plurality of openings corresponding to each other in a one-to-one relationship.

The above production method is characterized by rotating the lens module with respect to the light shielding block with an axis normal to the plurality of imaging regions as a rotation center axis; and then, fixing the lens module and the light shielding block to each other.

Effects of the Invention

According to the present invention, a light shielding block provided with light shielding walls is used in order to prevent light from being incident upon an imaging region from a lens not corresponding to the imaging region, so that a thin camera module can be realized.

Furthermore, in a camera module of the present invention, a light shielding block has a first sliding surface, and a lens module has a second sliding surface that slides on the first sliding surface. Furthermore, according to a production method of the present invention, the lens module is rotated with respect to the light shielding block with an axis normal to a plurality of imaging regions as a rotation center axis, and then, the lens module and the light shielding block are fixed to each other. Consequently, an image forming region of a lens does not extend off the imaging region, and it is not necessary to use a large imaging element having a number of unnecessary pixels, either. Thus, the camera module can be miniaturized and its cost can be reduced.

Accordingly, a thin, small, and low-cost compound eye camera module can be provided.

DESCRIPTION OF THE INVENTION

Figure 1:
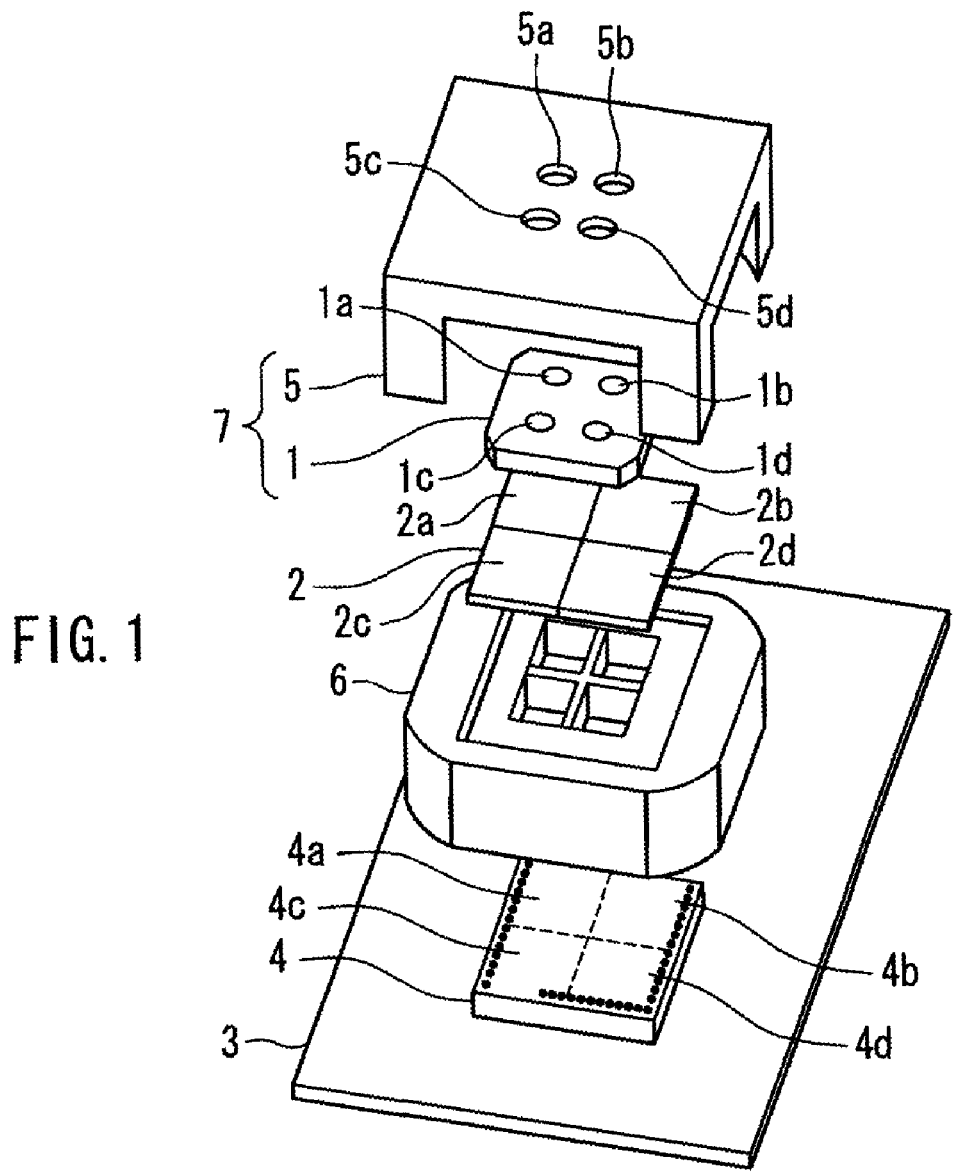
FIG. 1 is an exploded perspective view of a compound eye camera module according to Embodiment 1 of the present invention.
Figure 1:
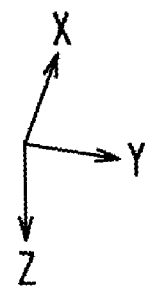

In the above compound eye camera module of the present invention, it is preferred that the first sliding surface includes at least a part of a cylindrical surface with the rotation center axis as a center axis, and the second sliding surface includes at least a part of a cylindrical surface. According to this configuration, a mechanism for rotating the lens module with respect to the light shielding block can be realized easily.

It is preferred that the above compound eye camera module of the present invention further includes a mechanism limiting an angle of the rotation of the lens module with respect to the light shielding block. According to this configuration, the rotation adjustment range of the lens module with respect to the light shielding block becomes small, so that the productivity can be enhanced, whereby a lower-cost compound eye camera module can be realized.

In this case, it is preferred that the lens module and the light shielding block are fixed to each other with the mechanism. According to this configuration, it is not necessary to newly design and provide components, shapes, and the like for fixing the lens module and the light shielding block to each other. Furthermore, a method of fixing the lens module and the light shielding block to each other can be simplified, which enhances assembly workability. Thus, a lower-cost compound eye camera module can be realized.

In the above compound eye camera module of the present invention, it is preferred that pixels in the plurality of imaging regions are arranged in a matrix in a first direction and a second direction orthogonal to each other, and the lens module has at least first to fourth lenses arranged in a lattice point shape. In this case, it is preferred that a direction connecting an optical axis of the first lens to an optical axis of the third lens and a direction connecting an optical axis of the second lens to an optical axis of the fourth lens are substantially parallel to the first direction, and a direction connecting the optical axis of the first lens to the optical axis of the second lens and a direction connecting the optical axis of the third lens to the optical axis of the fourth lens are substantially parallel to the second direction. Then, it is preferred that one or both of a displacement amount of the optical axis of the third lens in the second direction with respect to the optical axis of the first lens and a displacement amount of the optical axis of the fourth lens in the second direction with respect to the optical axis of the second lens is no greater than an arrangement pitch of the pixels in the second direction. According to this configuration, the distance to a subject can be measured with high precision in a short period of time using the principle of triangulation, with the first and third lenses placed substantially in the first direction and/or the second and fourth lenses placed substantially in the first direction.

Alternatively, in the above compound eye camera module of the present invention, it is preferred that pixels in the plurality of imaging regions are arranged in a matrix in a first direction and a second direction orthogonal to each other, and the lens module has at least first and second lenses. In this case, it is preferred that a direction connecting an optical axis of the first lens to an optical axis of the second lens is substantially parallel to the first direction. Then, it is preferred that a displacement amount of the optical axis of the second lens in the second direction with respect to the optical axis of the first lens is no greater than an arrangement pitch of the pixels in the second direction. According to this configuration, the distance to a subject can be measured with high precision in a short period of time using the principle of triangulation, with the first and second lenses placed substantially in the first direction.

Next, in the above production method of the present invention, it is preferred that the camera module further includes a mechanism limiting an angle of the rotation of the lens module with respect to the light shielding block. Then, it is preferred that the lens module is rotated with respect to the light shielding block in a range of the limited angle. According to this configuration, the rotation adjustment range of the lens module with respect to the light shielding block becomes small, so that the productivity can be enhanced, whereby a lower-cost compound eye camera module can be provided.

In this case, it is preferred that the lens module and the light shielding block are fixed to each other with the mechanism. According to this configuration, it is not necessary to newly design and provide components, shapes, and the like for fixing the lens module and the light shielding block to each other. Furthermore, a method of fixing the lens module and the light shielding block to each other can be simplified, which enhances assembly workability. Thus, a lower-cost compound eye camera module can be provided.

In the above production method of the present invention, it is preferred that pixels in the plurality of imaging regions are arranged in a matrix in a first direction and a second direction orthogonal to each other, and the lens module has at least first to fourth lenses arranged in a lattice point shape. In this case, it is preferred that the lens module is rotated with respect to the light shielding block so that a direction connecting an optical axis of the first lens to an optical axis of the third lens and a direction connecting an optical axis of the second lens to an optical axis of the fourth lens are substantially parallel to the first direction, and a direction connecting the optical axis of the first lens to the optical axis of the second lens and a direction connecting the optical axis of the third lens to the optical axis of the fourth lens are substantially parallel to the second direction, and one or both of a displacement amount of the optical axis of the third lens in the second direction with respect to the optical axis of the first lens and a displacement amount of the optical axis of the fourth lens in the second direction with respect to the optical axis of the second lens is no greater than an arrangement pitch of the pixels in the second direction. According to this configuration, the distance to a subject can be measured with high precision in a short period of time using the principle of triangulation, with the first and third lenses placed substantially in the first direction and/or the second and fourth lenses placed substantially in the first direction.

Alternatively, in the above production method of the present invention, it is preferred that pixels in the plurality of imaging regions are arranged in a matrix in a first direction and a second direction orthogonal to each other, and the lens module has at least first and second lenses. In this case, it is preferred that the lens module is rotated with respect to the light shielding block so that a direction connecting an optical axis of the first lens to an optical axis of the second lens is substantially parallel to the first direction, and a displacement amount of the optical axis of the second lens in the second direction with respect to the optical axis of the first lens is no greater than an arrangement pitch of the pixels in the second direction. According to this configuration, the distance to a subject can be measured with high precision in a short period of time using the principle of triangulation, with the first and second lenses placed substantially in the first direction.

Embodiment 1

Hereinafter, Embodiment 1 of the present invention will be described with reference to the drawings.

FIG. 1 is an exploded perspective view of a compound eye camera module of Embodiment 1. In FIG. 1, reference numeral 1 denotes a lens array, 2 denotes an optical filter array, 3 denotes a substrate, 4 denotes an imaging element, 5 denotes an upper barrel, 6 denotes a light shielding block (lower barrel), and 7 denotes a lens module. For convenience of the description, an XYZ rectangular coordinate system as shown is assumed. Herein, a Z-axis passes through substantially the center of an effective pixel region of the imaging element 4 and is normal to the effective pixel region. An X-axis is orthogonal to the Z-axis and parallel to light shielding walls 61a, 61c (described later) of the light shielding block 6, and a Y-axis is orthogonal to the Z-axis and parallel to light shielding walls 61b, 61d (described later) of the light shielding block 6.

The lens array 1 integrally has four single lenses 1a to 1d arranged in a lattice point shape on the same plane parallel to an XY-plane. Respective optical axes of the four lenses 1a to 1d are parallel to the Z-axis and arranged at four apexes of a virtual rectangle parallel to the XY-plane. The lenses 1a to 1d are designed respectively so as to satisfy the optical specifications such as MTF required with respect to light in a red, blue, or green wavelength band among three primary colors of light. Specifically, the lenses 1a, 1b, 1c, and 1d are designed optimally for light in red, green, green, and blue wavelength bands, respectively. The lenses 1a to 1d are formed integrally using a material such as glass or plastic. The respective lenses 1a to 1d allow light from a subject (not shown) to pass through the optical filter array 2 to form images on the imaging element 4.

The optical filter array 2 is placed between the lens array 1 and the imaging element 4. The optical filter array 2 also has four optical filters 2a to 2d arranged on the same plane parallel to the XY-plane in the same way as in the lens array 1. The four optical filters 2a to 2d respectively transmit light in only a red, green, or blue wavelength band. Specifically, the optical filter 2a transmits light in a red wavelength band, the optical filter 2b transmits light in a green wavelength band, the optical filter 2c transmits light in a green wavelength band, and the optical filter 2d transmits light in a blue wavelength band. In the case where it is necessary to cut infrared rays, such characteristics may be provided to the optical filters 2a to 2d. The four optical filters 2a to 2d are arranged respectively on the corresponding optical axes of the four lenses 1a to 1d.

The imaging element 4 is an imaging sensor such as a CCD, and has a number of pixels arranged two-dimensionally in a checkered pattern. The effective pixel region of the imaging element 4 is divided substantially equally into four imaging regions 4a to 4d. The four imaging regions 4a to 4d are arranged respectively on the corresponding optical axes of the four lenses 1a to 1d. Thus, subject images formed of only a red, green, or blue wavelength component are formed independently on the four imaging regions 4a to 4d. Specifically, only light in a red wavelength band in the light from a subject, having passed through the lens 1a, passes through the optical filter 2a to form a subject image formed of only a red wavelength component on the imaging region 4a. Similarly, only light in a green wavelength band in the light from the subject, having passed through the lens 1b, passes through the optical filter 2b to form a subject image formed of only a green wavelength component on the imaging region 4b. Only light in a green wavelength band in the light from the subject, having passed through the lens 1c, passes through the optical filter 2c to form a subject image formed of only a green wavelength component on the imaging region 4c. Only light in a blue wavelength band in the light from the subject, having passed through the lens 1d, passes through the optical filter 2d to form a subject image formed of only a blue wavelength component on the imaging region 4d.

Each pixel constituting the imaging regions 4a to 4d of the imaging element 4 photoelectrically converts the incident light from the subject, and outputs an electric signal (not shown) in accordance with the intensity of the light.

The electric signal output from the imaging element 4 is subjected to various signal processings and video processing. For example, a parallax amount between two images captured by the imaging regions 4b, 4c, upon which light in a green wavelength band is incident, is obtained, and based on the obtained parallax amount, a parallax amount among four images respectively captured by the four imaging regions 4a to 4d is obtained. Then, images of three colors: red, green, and blue are combined considering the above parallax amounts, whereby one color image can be created. Alternatively, the distance to the subject also can be measured using the principle of triangulation, comparing the two images captured by the imaging regions 4b, 4c with each other. These processings can be performed using a digital signal processor (a DSP, not shown) or the like.

Figure 2:
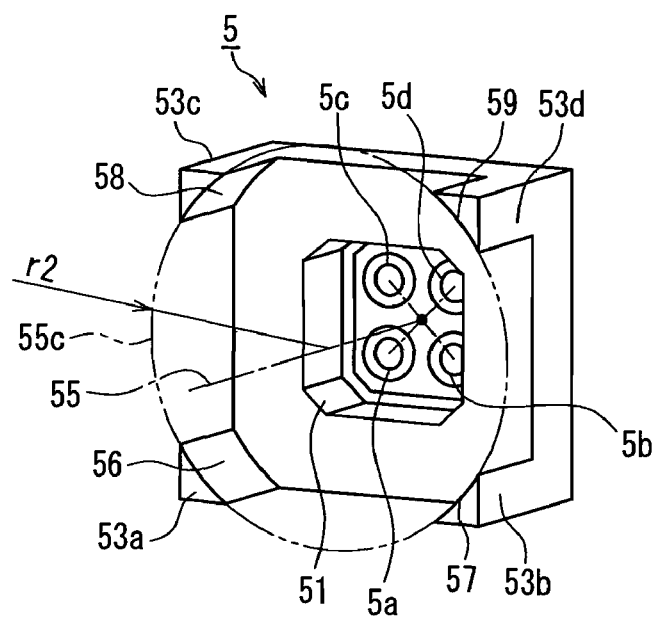
FIG. 2 is a perspective view of an upper barrel seen from an imaging element side in the compound eye camera module according to Embodiment 1 of the present invention.

The upper barrel 5 has a concave portion 51 on a lower surface thereof, which holds and fixes the lens array 1, as shown in FIG. 2. The lens array 1 is fitted in the concave portion 51 to be positioned with respect to the upper barrel 5. Furthermore, four apertures (openings) 5a to 5d are formed at positions through which the respective optical axes of the four lenses 1a to 1d of the held lens array 1 pass. The upper barrel 5 is made of a material that does not transmit light, and prevents unnecessary ambient light from being incident upon the lenses 1a to 1d from portions other than the apertures 5a to 5d.

The lens array 1 and the upper barrel 5 holding it constitute the lens module 7.

Figure 3:
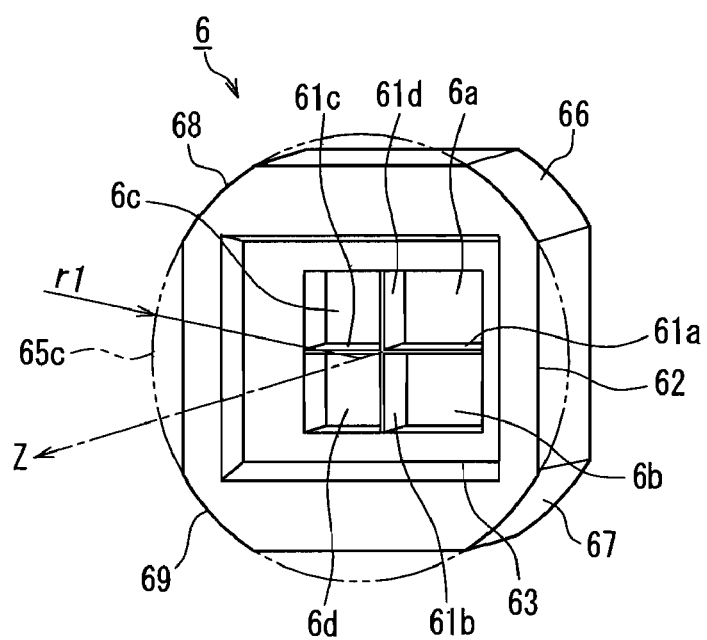
FIG. 3 is a perspective view of a light shielding block seen from a subject side in the compound eye camera module according to Embodiment 1 of the present invention.

As shown in FIG. 3, the light shielding block 6 includes light shielding walls 61a to 61d arranged in a cross shape so as to form four openings 6a to 6d independent from each other, and an outer barrel portion 62 holding the light shielding walls 61a to 61d. The light shielding walls 61a to 61d extend radially with respect to the Z-axis that is a center axis of the light shielding block 6. The light shielding walls 61a, 61c are placed along an XZ-plane, and the light shielding walls 61b, 61d are placed along a YZ-plane. The four openings 6a to 6d are arranged respectively on the corresponding optical axes of the four lenses 1a to 1d. The light shielding walls 61a to 61d divide the effective pixel region of the imaging element 4 into four imaging regions 4a to 4d. The size of the openings 6a to 6d seen from a direction parallel to the Z-axis is substantially the same as or larger than the imaging regions 4a to 4d. Light from the subject having passed through the lenses 1a to 1d respectively pass through the openings 6a to 6d to form images on the imaging regions 4a to 4d, respectively. The light shielding walls 61a to 61d prevent the light having passed through one of the lenses 1a to 1d from being incident upon an imaging region not corresponding to the lens. For example, in order for light in a green wavelength band having been incident upon the lens 1b diagonally and passed through the optical filter 2b not be incident upon the imaging region 4a upon which only light in a red wavelength band is supposed to be incident originally, the light shielding wall 61a blocking the light in a green wavelength band is provided along a boundary between the imaging regions 4a and 4b. The outer barrel portion 62 surrounding the openings 6a to 6d prevents ambient light, not passing through the lens array 1 and the optical filter array 2, from being incident upon the imaging regions 4a to 4d. Thus, owing to the light shielding block 6, unnecessary light is not incident upon the respective imaging regions 4a to 4d, and the occurrence of stray light and the like can be prevented. In order to allow this function to be exhibited effectively, the light shielding block 6 is made of a material that does not transmit light in the same way as in the upper barrel 5. Furthermore, it is preferred that the light shielding walls 61a to 61d and side surfaces of the outer barrel portion 62, exposed to the openings 6a to 6d, are subjected to various surface treatments (for example, roughening, plating, blackening, etc.) so that the reflection of light is minimized.

A concave portion 63 holding and fixing the optical filter array 2 is provided on a surface of the light shielding block 6 on the lens array 1 side. The optical filter array 2 is fitted in the concave portion 63 to be positioned with respect to the light shielding block 6. The optical filters 2a to 2d are arranged respectively in the openings 6a to 6d.

Next, a method of assembling a camera module of the present embodiment will be described.

The imaging element 4 is positioned and fixed with respect to the substrate 3. The imaging element 4 is connected electrically to the substrate 3 via wire bonding or the like, and further is connected to an electronic component such as a DSP that processes the electric signal from the imaging element 4. The electronic component such as a DSP may be mounted on the substrate 3. The substrate 3 performs functions as electrical connection and a reference plane of each component during assembly.

Next, the light shielding block 6 with the optical filter array 2 fixed thereto is positioned with respect to the imaging element 4 and fixed onto the substrate 3 in such a manner that the Z-axis that is a center axis of the light shielding block 6 passes through substantially the center of the effective pixel region of the imaging element 4, and the light shielding walls 61a to 61d of the light shielding block 6 are matched with checkered arrangement directions of many pixels constituting the imaging element 4. Thus, a light-receiving plane of the imaging element 4 becomes normal to the Z-axis, one arrangement direction (for example, a lateral arrangement direction) of the number of pixels arranged in a matrix constituting the imaging element 4 becomes parallel to the X-axis, and the other arrangement direction (for example, a vertical arrangement direction) becomes parallel to the Y-axis. Furthermore, the effective pixel region of the imaging element 4 is divided substantially equally into the four imaging regions 4a to 4d corresponding to the four openings 6a to 6d.

Next, the lens module 7 with the lens array 1 fixed to the upper barrel 5 is fitted to the light shielding block 6. At this time, tip end surfaces of legs 53a to 53d at four corners of the upper barrel 5 come into contact with the substrate 3. Thus, the lens array 1 becomes parallel to the XY-plane, and is positioned in the Z-axis direction.

Figure 4:
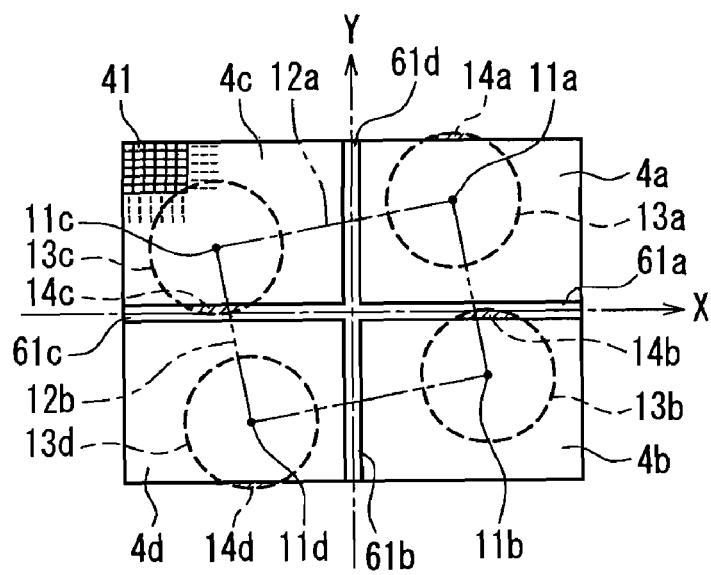
FIG. 4 is a plan view showing the arrangement of lenses of a lens array with respect to imaging regions of the imaging element before being positioned in a direction parallel to a plane normal to an optical axis in the compound eye camera module according to Embodiment 1 of the present invention.

Furthermore, in the direction parallel to the XY-plane, the lens module 7 including the lens array 1 needs to be positioned exactly with respect to the imaging element 4 and the light shielding block 6. More specifically, a center axis 55 (which is parallel to each optical axis of the four lenses 1a to 1d of the lens array 1, and passes through the center of the virtual rectangle with each optical axis position as an apex) of the upper barrel 5 shown in FIG. 2 needs to be substantially matched with the Z-axis in the XY-plane. In addition, as shown in FIG. 4, a long side 12a and a short side 12b of the virtual rectangle with optical axis positions 11a to 11d of the four lenses 1a to 1d as apexes need to be substantially parallel to the X-axis and the Y-axis, respectively. This is because, if the long side 12a and the short side 12b are not parallel to the X-axis and the Y-axis, respectively, shaded regions 14a to 14d among image-forming regions 13a to 13d of the lenses 1a to 1d extend off the imaging regions 4a to 4d. That is, pixels required for capturing the subject whose images are formed by the lenses 1a to 1d cannot be ensured. In FIG. 4, reference numeral 41 denotes pixels constituting the imaging element 4.

The present embodiment realizes the above as follows. As shown in FIG. 3, first sliding surfaces 66, 67, 68, and 69, which are parts of a virtual cylindrical surface 65c having a radius r1 with the Z-axis that is the center axis of the light shielding block 6 as a center axis, are provided on outer peripheral walls at four corners of the light shielding block 6 positioned and fixed to the substrate 3. On the other hand, as shown in FIG. 2, second sliding surfaces 56, 57, 58, and 59, which are parts of a virtual cylindrical surface 55c having a radius r2 with the center axis 55 of the upper barrel 5 as a center axis, are provided on inner wall surfaces of the legs 53a to 53d at four corners of the upper barrel 5 of the lens module 7. The radius r2 is set to be slightly larger than the radius r1 so that a minimum required gap, allowing the second sliding surfaces 56, 57, 58, and 59 of the upper barrel 5 on a rotation side to slide on the first sliding surfaces 66, 67, 68, and 69 of the light shielding block 6 on a fixed side, is formed between the first sliding surfaces 66, 67, 68, and 69 and the second sliding surfaces 56, 57, 58, and 59.

When the lens module 7 is fitted to the light shielding block 6 so that the second sliding surfaces 56, 57, 58, and 59 of the upper barrel 5 are opposed respectively to the first sliding surfaces 66, 67, 68, and 69 of the light shielding block 6, the Z-axis that is the center axis of the light shielding block 6 is substantially matched with the center axis 55 of the upper barrel 5. Then, by adjusting the lens module 7 with respect to the light shielding block 6 in the XY-plane by rotation, the long side 12a and the short side 12b of the virtual rectangle with the optical axis positions 11a to 11d of the four lenses 1a to 1d as apexes, shown in FIG. 4, are rendered parallel to the X-axis and the Y-axis, respectively.

Figure 5:
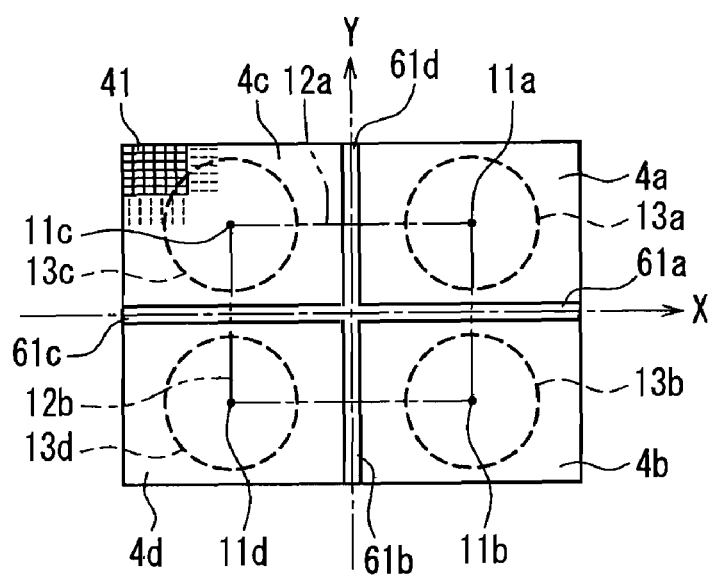
FIG. 5 is a plan view showing the arrangement of lenses of a lens array with respect to the imaging regions of the imaging element after being positioned in a direction parallel to a plane normal to an optical axis in the compound eye camera module according to Embodiment 1 of the present invention.

The rotation adjustment of the lens module 7 can be performed, for example, as follows. A parallel light source as a subject is set on the Z-axis, and subject images are formed on the imaging regions 4a to 4d via the lenses 1a to 1d and the optical filters 2a to 2d. The optical axis positions 11a to 11d of the lenses 1a to 1d are calculated from positions of spots captured in the imaging regions 4a to 4d, respectively. Then, as shown in FIG. 5, the lens module 7 is rotated in the XY-plane so that the long side 12a and the short side 12b of the virtual rectangle with the optical axis positions 11a to 11d as apexes become parallel to the X-axis and the Y-axis, respectively. Consequently, the subject images can be captured in the respective imaging regions 4a to 4d without being lost, while the image-forming regions 13a to 13d of the lenses 1a to 1d do not extend off the imaging regions 4a to 4d.

Since the difference between the radius r1 and the radius r2 is small, the second sliding surfaces 56, 57, 58, and 59 slide while being substantially in contact with the first sliding surfaces 66, 67, 68, and 69 during rotation adjustment. Thus, the center axis 55 of the upper barrel 5 hardly is displaced from the Z-axis in the XY-plane. Consequently, during the rotation adjustment of the lens module 7, the relative positional relationships of the respective optical axis positions 11a to 11d with respect to the respective imaging regions 4a to 4d are substantially the same at all times.

A plane including the tip end surfaces of the legs 53a to 53d at four corners of the upper barrel 5 is parallel to a plane on which the four lenses 1a to 1d are arranged. Then, during the rotation adjustment of the lens module 7, the tip end surfaces of the legs 53a to 53d at four corners slide while being in contact with the substrate 3 at all times. Thus, even if the lens module 7 is rotated, the spot shapes formed respectively by the lenses 1a to 1d on the imaging regions 4a to 4d do not change. This facilitates a rotation adjustment operation, and a photographed image is not changed by the rotation position.

As described above, according to the present embodiment, in order to prevent light from a lens not corresponding to an imaging region from being incident upon the imaging region, the light shielding block 6 having the light shielding walls 61a to 61d is used, so that it is not necessary to provide two layers of the optical filter arrays for conducting color separation. Thus, the thickness of a camera module can be reduced.

Furthermore, the light shielding block 6 includes the first sliding surfaces 66, 67, 68, and 69, and the upper barrel 5 includes the second sliding surfaces 56, 57, 58, and 59, so that the center axis (Z-axis) of the light shielding block 6 can be matched substantially with the center axis 55 of the upper barrel 5. Furthermore, by adjusting the lens module 7 with respect to the light shielding block 6 and the imaging element 4 by rotation, the long side 12a and the short side 12b of the virtual rectangle with the optical axis positions 11a to 11d of the lenses 1a to 1d as apexes can be rendered parallel to the X-axis and the Y-axis, respectively. Consequently, the image-forming regions 13a to 13d of the lenses 1a to 1d do not extend off the imaging regions 4a to 4d, and it is not necessary to use a large imaging element having a number of unnecessary pixels. Thus, the camera module can be miniaturized, and the cost thereof can be reduced.

The above embodiment is an example, and the present invention is not limited thereto.

For example, in the above embodiment, the case using a parallel light source as a subject during rotation adjustment of the lens module 7 has been illustrated. However, the subject during rotation adjustment is not limited thereto in the present invention, and for example, the optical axis positions 11a to 11d may be obtained using various kinds of charts.

Furthermore, in the above embodiment, the rotation adjustment is performed with the light shielding block 6 and the imaging element 4 being on a fixed side and the lens module 7 being on a rotation side. However, the present invention is not limited thereto, and even if the fixed side and the rotation side are reversed compared with the above, the relative position therebetween can be changed, and the same effects as those in the above can be obtained.

Furthermore, in the above embodiment, although the optical system is illustrated, which separates light from a subject to light in four (red, green, green, and blue) wavelength bands, the optical system of the present invention is not limited thereto, and for example, an optical system that separates light to light in two near-infrared wavelength bands and light in two green wavelength bands may be used, or a combination of light in the other wavelength bands may be used. The above effects of the present embodiment can be obtained irrespective of a wavelength band to be selected.

Furthermore, in the above embodiment, although the example in which the lens array 1 includes the four lenses 1a to 1d has been illustrated, the lens array of the present invention is not limited thereto. The number of the lenses to be provided in the lens array may be two or more without being limited to four. Furthermore, the arrangement of two or more lenses is not limited to a lattice point arrangement.

Furthermore, in the above embodiment, although the example in which the lens module 7 includes the lens array 1 and the upper barrel 5 holding the lens array 1, and the second sliding surfaces 56, 57, 58, and 59 are formed on the upper barrel 5 has been illustrated, the lens module 7 of the present invention is not limited thereto. For example, the lens module 7 may be formed of a member including the lens array having the lenses 1a to 1d and the second sliding surfaces 56, 57, 58, and 59, and a diaphragm member having the apertures 5a to 5d.

Furthermore, in the above embodiment, although the first sliding surfaces 66, 67, 68, and 69 are formed discontinuously only at four corners of the light shielding block 6, the first sliding surfaces of the present invention are not limited thereto and may be, for example, a cylindrical surface extending over the entire periphery of the light shielding block 6. Similarly, in the above embodiment, although the second sliding surfaces 56, 57, 58, and 59 are formed discontinuously on the legs 53a to 53d at four corners of the upper barrel 5, the second sliding surfaces of the present invention are not limited thereto and may be, for example, a cylindrical surface extending over the entire periphery.

Furthermore, in the above embodiment, although the first sliding surfaces and the second sliding surfaces respectively include four discontinuous surfaces, the first sliding surfaces and the second sliding surfaces of the present invention are not limited thereto. The first sliding surfaces and/or the second sliding surfaces may include two, three, or at least five discontinuous surfaces, as long as the second sliding surfaces can be slid on the first sliding surfaces to rotate the lens module 7 with respect to the light shielding block 6.

Furthermore, in the above embodiment, although both the first sliding surfaces and the second sliding surfaces are along a cylindrical surface, the first sliding surfaces and the second sliding surfaces of the present invention are not limited thereto. For example, the first sliding surfaces and the second sliding surfaces may be those along the surface of a rotator such as a circular conical surface or a spherical surface.

Furthermore, in the present embodiment, although the example in which the first sliding surface and the second sliding surface are in a plane-contact with each other has been described, the present invention is not limited thereto. For example, one of the first sliding surface and the second sliding surface may be a plane having a predetermined area, and the other may be a spherical surface that is in a point-contact with the plane having a predetermined area or a cylindrical surface that is in a line-contact with the plane having a predetermined area.

Furthermore, in the above embodiment, although the example has been described in which the second sliding surfaces 56, 57, 58, and 59 along the virtual cylindrical surface having the radius r2 of the lens module 7 are placed on an outer side of the first sliding surfaces 66, 67, 68, and 69 along the virtual cylindrical surface having the radius r1 of the light shielding block 6, the second sliding surfaces of the lens module 7 may be placed on an inner side of the first sliding surfaces of the light shielding block 6 instead. In this case, r1>r2 is satisfied, and it is preferred that the difference therebetween is smaller in the same way as in the above embodiment.

Furthermore, in the above embodiment, the case has been described in which the lens module 7 is adjusted with respect to the light shielding block 6 by rotation so that the respective directions of the long side 12a and the short side 12b of the virtual rectangle with the optical axis positions 11a to 11d of the lenses 1a to 1d as apexes are parallel to the checkered arrangement directions (i.e., the Y-axis and the X-axis) of a number of pixels constituting the imaging element 4. However, the rotation adjustment of the present invention is not limited thereto. For example, the lens module 7 may be adjusted with respect to the light shielding block 6 by rotation so that the respective directions of the long side 12a and the short side 12b are inclined at a slight angle with respect to the checkered arrangement directions (i.e., the Y-axis and the X-axis) of a number of pixels of the imaging element 4. In this case, a high-resolution image can be obtained by pixel shifting.

Embodiment 2

Hereinafter, Embodiment 2 of the present invention will be described with reference to the drawings.

Figure 6:
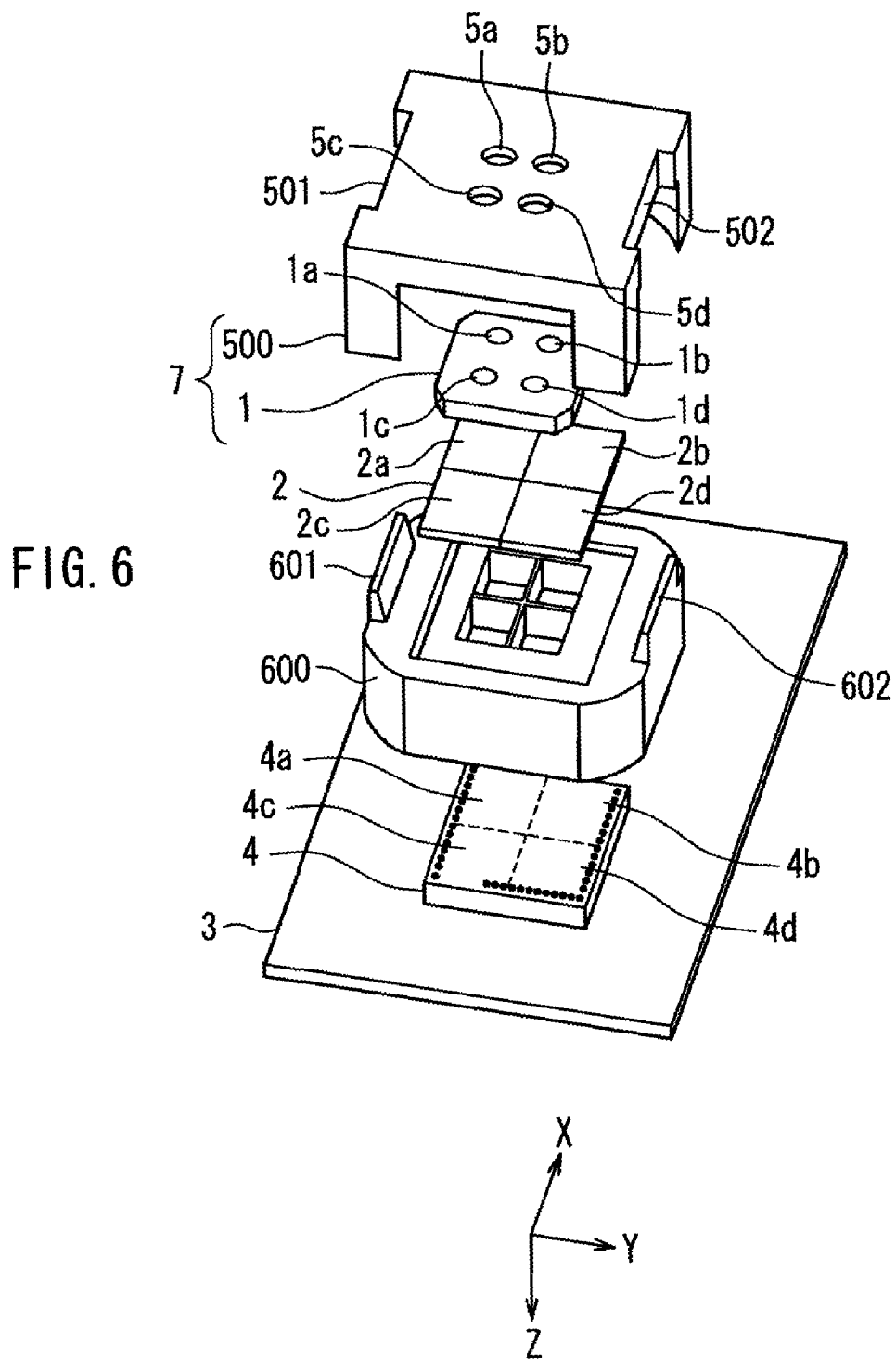
FIG. 6 is an exploded perspective view of a compound eye camera module according to Embodiment 2 of the present invention.

FIG. 6 is an exploded perspective view of a compound eye camera module of Embodiment 2. In FIG. 6, the same members as those in FIG. 1 are denoted with the same reference numerals as those therein, and the description thereof will be omitted.

The basic configuration of the camera module of the present embodiment is substantially the same as that of Embodiment 1. The present embodiment is different from Embodiment 1 in the shapes of an upper barrel 500 and a light shielding block 600.

Figure 7:
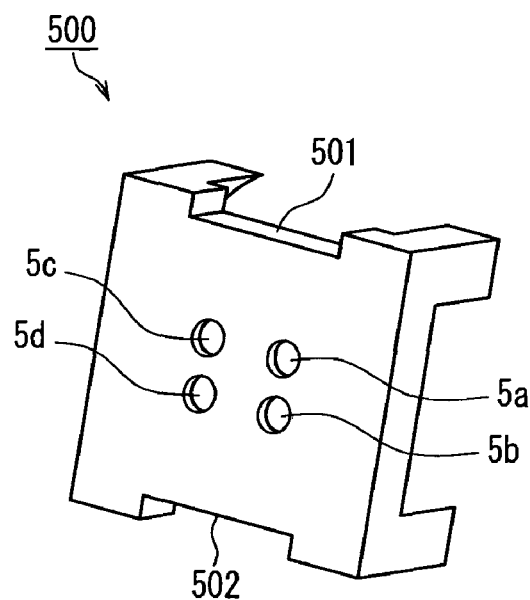
FIG. 7 is a perspective view of an upper barrel seen from a subject side in the compound eye camera module according to Embodiment 2 of the present invention.

FIG. 7 is a perspective view of the upper barrel 500 seen from a subject side. The upper barrel 500 in the present embodiment is different from the upper barrel 5 in Embodiment 1 in that grooves 501, 502 are provided on two opposed side surfaces.

Figure 8:
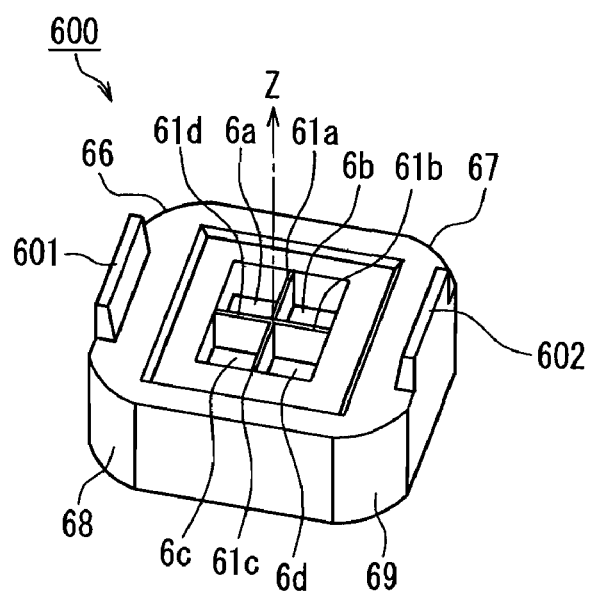
FIG. 8 is a perspective view of a light shielding block seen from the subject side in the compound eye camera module according to Embodiment 2 of the present invention.

FIG. 8 is a perspective view of the light shielding block 600 seen from the subject side. The light shielding block 600 in the present embodiment is different from the light shielding block 6 in Embodiment 1 in that protruding walls 601, 602 formed of the opposed two side surfaces extending to the subject side are provided.

Figure 9:
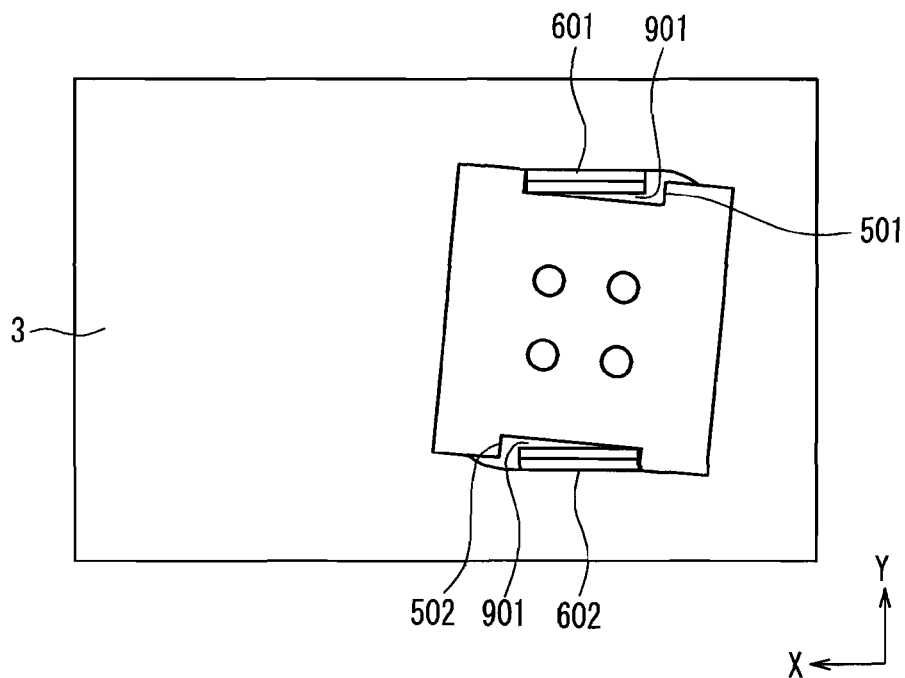
FIG. 9 is a plan view of the compound eye camera module according to Embodiment 2 of the present invention.
Figure 10:
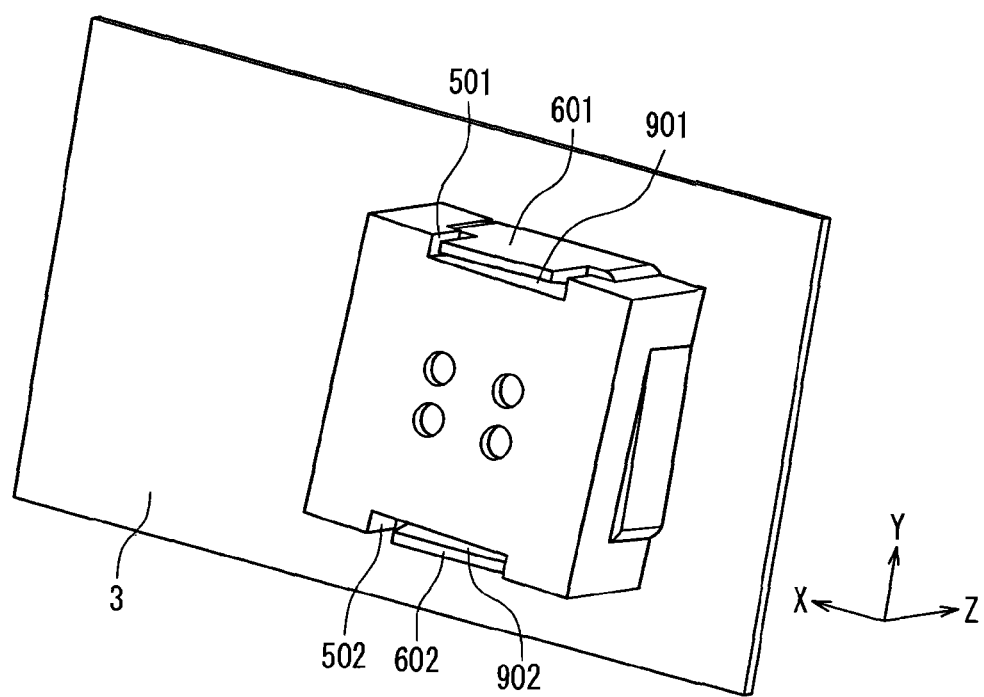
FIG. 10 is a perspective view of the compound eye camera module according to Embodiment 2 of the present invention seen from the subject side.

When the upper barrel 500 is fitted to the light shielding block 600, as shown in FIGS. 9 and 10, the walls 601, 602 are fitted in the grooves 501, 502. At this time, the grooves 501, 502 are larger than the walls 601, 602, so that the upper barrel 500 can be rotated in the XY-plane with respect to the light shielding block 600. The rotatable range thereof is limited to a range in which the walls 601, 602 are not in contact with the grooves 501, 502. That is, the walls 601, 602 and the grooves 501, 502 function as a mechanism (stopper) of limiting the angle of a rotation of the lens module 7 including the upper barrel 500 with respect to the light shielding block 600.

In the present embodiment, merely by fitting the upper barrel 500 to the light shielding block 600 so that the walls 601, 602 are fitted in the grooves 501, 502, the inclination amounts of the long side 12a and the short side 12b of the virtual rectangle with the optical axis positions 11a to 11d of the four lenses 1a to 1d as apexes shown in FIG. 4, with respect to the X-axis and the Y-axis, can be decreased. Thus, the adjustment amount in the rotation adjustment step of the lens module 7, conducted later, can be reduced. Consequently, the time of the rotation adjustment step of the lens module 7 can be shortened, and the productivity of the camera module can be enhanced.

Gaps 901, 902 are provided between the grooves 501, 502 and the walls 601, 602 to such a degree that the lens module 7 can be adjusted by rotation. Thus, after the rotation adjustment step of the lens module 7, the upper barrel 500 and the light shielding block 600 can be fixed to each other by applying an adhesive to the gaps 901, 902. Accordingly, by fixing the lens module 7 and the light shielding block 600 to each other, using a rotation restriction mechanism (stopper) of the lens module 7 with respect to the light shielding block 600, a method of fixing them can be simplified, which enhances assembly workability. Furthermore, it is not necessary to newly design and provide components, shapes, and the like for fixing the light shielding block 600 and the lens module 7 to each other. Thus, a compound eye camera module can be realized at a lower cost.

The side surfaces of the grooves 501, 502, and/or the walls 601, 602 may be inclined so that the gaps between the grooves 501, 502 and the walls 601, 602 increase toward a subject in the Z-axis direction. Consequently, an adhesive can be injected into the gaps 901, 902 precisely, and the contact area of the adhesive increases, so that the light shielding block 600 and the lens module 7 can be fixed to each other more strongly.

In the above embodiment, although the combination of the grooves 501, 502 and the walls 601, 602 has been illustrated as the rotation restriction mechanism of the lens module 7 with respect to the light shielding block 600, the rotation restriction mechanism of the present invention is not limited thereto. Any mechanism capable of allowing the rotation of the lens module 7 in the XY-plane with respect to the light shielding block 600 and restricting the rotation angle in a predetermined range, such as a combination of an arc-shaped groove (or hole) and a pin inserted therein, can be used. Even in this case, the same effects as those in the above can be obtained.

Embodiment 3

Figure 11A:
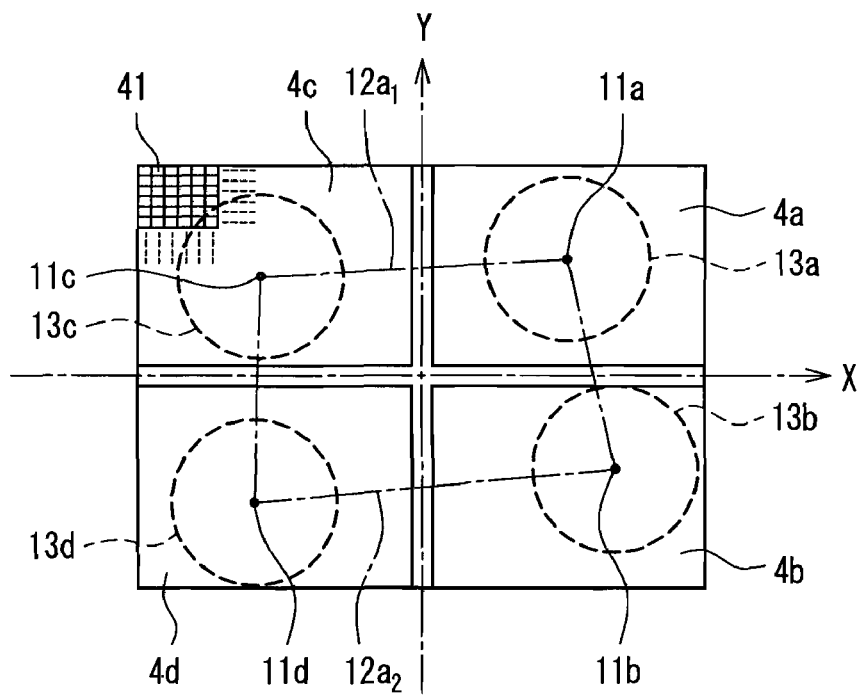
FIG. 11A is a plan view showing a positional relationship between optical axes of a plurality of lenses and a plurality of imaging regions before rotation adjustment of a lens module with respect to a light shielding block in a compound eye camera module according to Embodiment 3 of the present invention.

The lens array 1 having a plurality of lenses can be obtained integrally, for example, by molding a lens material (e.g., resin or glass) with a mold. In such a case, the optical axis positions of a plurality of lenses on the obtained lens array may be displaced from desired positions due to the production error of the mold, the molding error, etc. For example, as shown in FIG. 11A, there is a case in which a quadrangle with the optical axis positions 11a to 11d of the four lenses 1a to 1d (not shown) arranged in a lattice point shape as apexes may not exactly be a rectangle. In such a case, even if the lens module 7 is adjusted by rotation with respect to the light shielding blocks 6, 600 so that the image-forming regions 13a to 13d of the lenses 1a to 1d do not extend off the imaging regions 4a to 4d, for example, in the case where the distance to a subject is measured with a camera module, using the principle of triangulation, there arise problems in that the measurement precision decreases and the calculation time is prolonged.

Figure 12A:
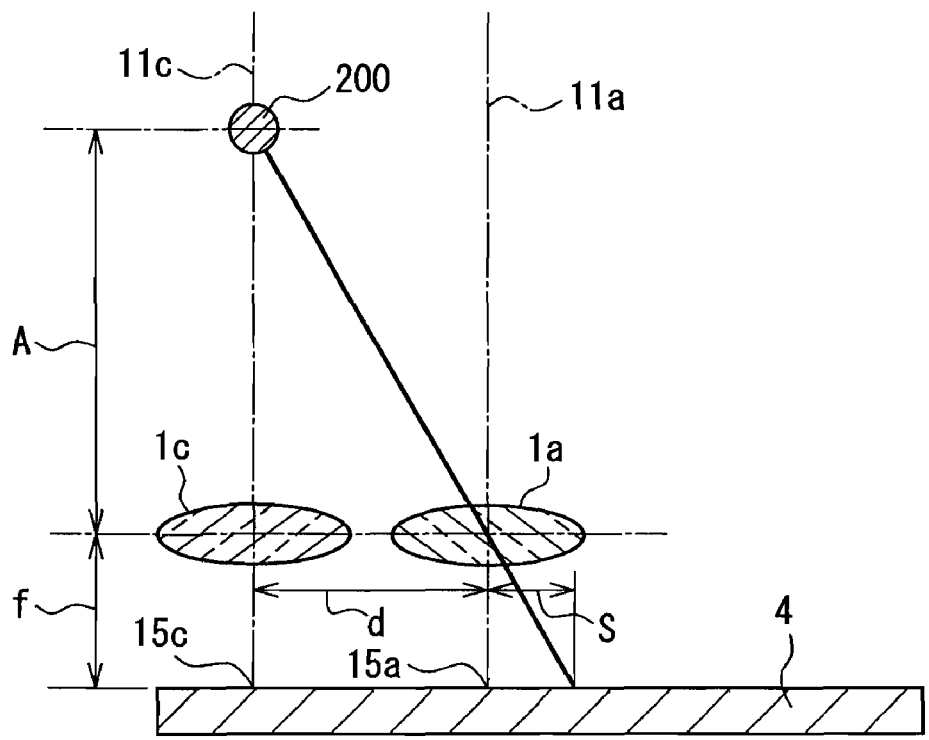
FIG. 12A is a side view illustrating the principle of measuring a distance to a subject using the compound eye camera module according to the present invention.
Figure 12B:
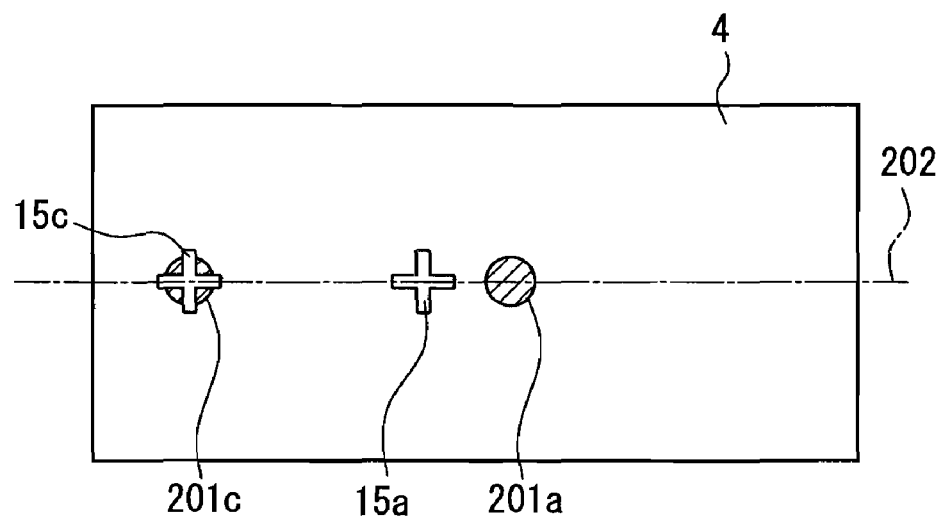
FIG. 12B is a plan view illustrating the principle of measuring a distance to a subject using the compound eye camera module according to the present invention.
Figure 13:
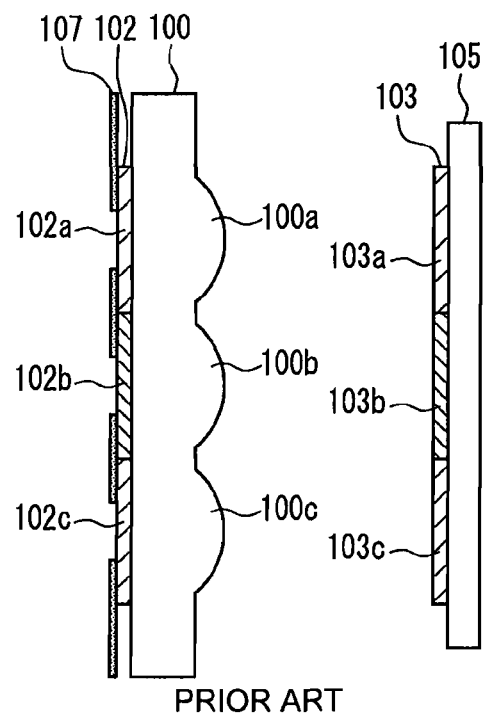
FIG. 13 is a cross-sectional view of an imaging system of a conventional camera module.
Figure 14:
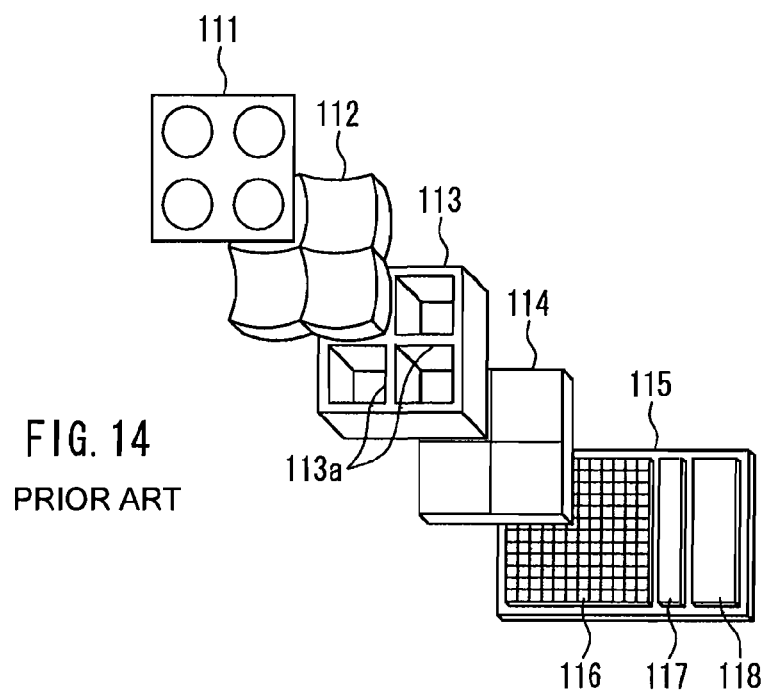
FIG. 14 is an exploded perspective view of an imaging system of another conventional camera module.

The principle of measuring a distance with a camera module will be described with reference to FIGS. 12A and 12B. FIG. 12A is a side view seen in a direction normal to a plane including the optical axes 11a, 11c of the two lenses 1a, 1c, and FIG. 12B is a plan view seen in a direction parallel to the optical axes 11a, 11c of the two lenses 1a, 1c. Reference numerals 15a, 15c denote positions where the optical axes 11a, 11c cross the imaging regions of the imaging element 4. A subject 200 on the optical axis 11c is formed as subject images 201a, 201c on the imaging regions of the imaging element 4 by the lenses 1a, 1c. Since the optical axes 11a, 11c of the lenses 1a, 1c are different from each other, when the distances from the lenses 1a, 1c to the subject 200 change, the position of the subject image 201a moves on a straight line 202 connecting an intersection point 15a to an intersection point 15c on the imaging element 4. This phenomenon is called a "parallax". Assuming that the displacement amount (hereinafter, referred to as a "parallax amount") of the subject image 201a from the intersection point 15a is S, the distance between the optical axes 11a and 11c is d, a subject distance (distance from the lens 1c to the subject 200) is A, and an image-forming distance is f, a relationship: A/d=f/S is satisfied. Thus, if the parallax amount S is obtained, the subject distance A can be obtained. Specifically, assuming that the captured image obtained via the lens 1c is a reference image, and the captured image obtained via the lens 1a is an image to be compared, the displacement amount (i.e., a parallax amount) S of the position of the subject image 201a in the image to be compared, with respect to the position of the subject image 201c in the reference image is obtained. In order to obtain the parallax amount S, it is necessary to search for the subject image 201a corresponding to the subject image 201c in the reference image, in the image to be compared (this is referred to as "stereo matching"). In the case of performing the stereo matching, if the direction of the straight line 202 shown in FIG. 12B is not matched with the arrangement direction of pixels in the imaging element 4, the subject image 201a cannot be specified exactly in the image to be compared, and the subject distance cannot be obtained exactly. Alternatively, a great amount of time is required for searching for the subject image 201a in the image to be compared, and consequently, a calculation time is prolonged.

The case will be considered in which, using the camera module having four lenses arranged in a lattice point shape as shown in FIG. 11A, the stereo matching is performed between two captured images obtained from the two upper imaging regions 4a, 4c to measure a subject distance and the stereo matching is performed between two captured images obtained from the two lower imaging regions 4b, 4d to measure a subject distance. In this case, if the direction of a straight line $12a_1$ connecting the optical axes 11a, 11c and/or the direction of a straight line $12a_2$ connecting the optical axes 11b, lid are not parallel to the lateral arrangement direction (i.e., the X-axis) of the pixels 41, the measurement precision of the subject distance decreases as described above and a calculation time is prolonged.

Figure 11B:
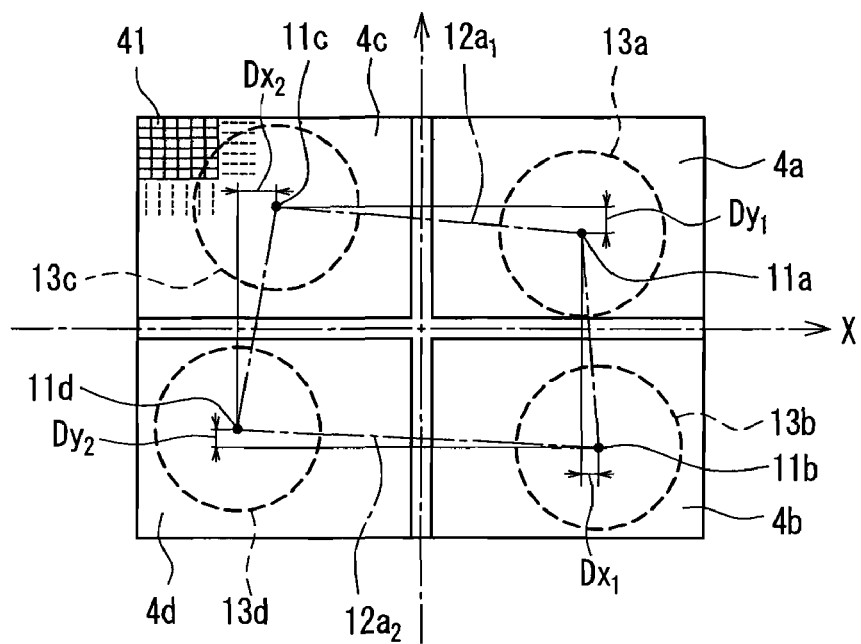
FIG. 11B is a plan view showing a positional relationship between the optical axes of the plurality of lenses and the plurality of imaging regions after the rotation adjustment of the lens module with respect to the light shielding block in the compound eye camera module according to Embodiment 3 of the present invention.

The lens module 7 is adjusted with respect to the light shielding blocks 6, 600 by rotation so that the degree of parallelization of the straight lines $12a_1$ and $12a_2$ with respect to the X-axis is optimized. Specifically, as shown in FIG. 11B, it is preferred that one (more preferably both) of a displacement amount $Dy_1$ of the optical axis 11a in the Y-axis direction with respect to the optical axis 11c and a displacement amount $Dy_2$ of the optical axis 11b in the Y-axis direction with respect to the optical axis 11d is set to be no greater than an arrangement pitch of the pixels 41 in the Y-axis direction. Thus, the measurement precision and calculation time without any practical problems in the measurement of a subject distance are obtained.

In the above description, although the case has been described where the stereo matching is performed between two captured images obtained from the two upper imaging regions 4a, 4c and the stereo matching is performed between two captured images obtained from the two lower imaging regions 4b, 4d, the present invention is not limited thereto.

For example, it also is possible that the stereo matching is performed between two captured images obtained from the two right imaging regions 4a, 4b, and the stereo matching is performed between two captured images obtained from the two left imaging regions 4c, 4d. In this case, it is preferred that the lens module 7 is adjusted by rotation with respect to the light shielding blocks 6, 600 so that one (preferably, both) of a displacement amount $Dx_1$ of the optical axis 11b in the X-axis direction with respect to the optical axis 11a and a displacement amount $Dx_2$ of the optical axis lid in the X-axis direction with respect to the optical axis 11c is no greater than the arrangement pitch of the pixels 41 in the X-axis direction.

Alternatively, a subject distance may be measured using only two captured images obtained from the two upper imaging regions 4a, 4c. In this case, it is preferred that the displacement amount $Dy_1$ is set to be no greater than the arrangement pitch of the pixels 41 in the Y-axis direction. Similarly, a subject distance may be measured using only two captured images obtained from the two lower imaging regions 4b, 4d. In this case, it is preferred that the displacement amount $Dy_2$ is set to be no greater than the arrangement pitch of the pixels 41 in the Y-axis direction. Furthermore, a subject distance may be measured using only two captured images obtained from the two right imaging regions 4a, 4b. In this case, it is preferred that the displacement amount $Dx_1$ is set to be no greater than the arrangement pitch of the pixels 41 in the X-axis direction. Similarly, a subject distance may be measured using only two captured images obtained from the two left imaging regions 4c, 4d. In this case, it is preferred that the displacement amount $Dx_2$ is set to be no greater than the arrangement pitch of the pixels 41 in the X-axis direction.

In the above embodiment, the case where the lens array has four lenses has been described. In the case where the lens array has only two lenses, the effects similar to those in the above can be obtained by setting the direction connecting the optical axes of two lenses to be substantially parallel to the X-axis or the Y-axis as described above.

Furthermore, in the case where the lens array has at least five lenses, the same effects as those in the above can be obtained by placing two or four lenses among the at least five lenses with respect to the imaging element 4 so that the above conditions are satisfied. In order to enhance the measurement precision of a subject distance, it is preferred to select lenses to be used for measuring a distance so that a distance d between optical axes of the lenses increases.

In order to enhance the measurement precision and calculation speed, it is preferred that the stereo matching is performed between two captured images obtained from light in the same wavelength band. However, the stereo matching can be performed, even between two captured images obtained from light in different wavelength bands, and a subject distance can be measured.

Any of the embodiments described above strictly is intended to clarify the technical contents of the present invention. The present invention should not be interpreted by being limited to such specific examples, and can be carried out by being variously modified within the scope of the spirit of the present invention and the claims and should be interpreted broadly.

INDUSTRIAL APPLICABILITY

The field of the compound eye camera module of the present invention is not particularly limited, and the present invention can be preferably used for, for example, a small and thin mobile telephone having a camera function, a digital still camera, a security camera, a vehicle-mounted camera, and the like.

The invention claimed is:

1. A compound eye camera module, comprising:
   a lens module integrally having a plurality of lenses arranged on a single plane;
   a plurality of imaging regions;
   an optical filter array placed between the lens module and the plurality of imaging regions and having a plurality of optical filters, each transmitting light in a particular wavelength band; and
   a light shielding block placed between the lens module and the plurality of imaging regions and having light shielding walls forming a plurality of openings independent from each other, the plurality of lenses, the plurality of imaging regions, the plurality of optical filters, and the plurality of openings corresponding to each other in a one-to-one relationship,
   wherein a first sliding surface is provided on the light shielding block, and
   a second sliding surface sliding on the first sliding surface is provided on the lens module so that the lens module is capable of rotating with respect to the light shielding block with an axis normal to the plurality of imaging regions as a rotation center axis.

2. The compound eye camera module according to claim 1, wherein the first sliding surface includes at least a part of a cylindrical surface with the rotation center axis as a center axis, and the second sliding surface includes at least a part of a cylindrical surface.

3. The compound eye camera module according to claim 1, further comprising a mechanism limiting an angle of the rotation of the lens module with respect to the light shielding block.

4. The compound eye camera module according to claim 3, wherein the lens module and the light shielding block are fixed to each other with the mechanism.

5. The compound eye camera module according to claim 1, wherein pixels in the plurality of imaging regions are arranged in a matrix in a first direction and a second direction orthogonal to each other,
   the lens module has at least first to fourth lenses arranged in a lattice point shape,
   a direction connecting an optical axis of the first lens to the optical axis of the third lens and a direction connecting an optical axis of the second lens to an optical axis of the fourth lens are parallel to the first direction,
   a direction connecting the optical axis of the first lens to the optical axis of the second lens and a direction connecting the optical axis of the third lens to the optical axis of the fourth lens are parallel to the second direction, and one or both of a displacement amount of the optical axis of the third lens in the second direction with respect to the optical axis of the first lens and a displacement amount of the optical axis of the fourth lens in the second direction with respect to the optical axis of the second lens is no greater than an arrangement pitch of the pixels in the second direction.

6. The compound eye camera module according to claim 1, wherein pixels in the plurality of imaging regions are arranged in a matrix in a first direction and a second direction orthogonal to each other, the lens module has at least first and second lenses, a direction connecting an optical axis of the first lens to an optical axis of the second lens is parallel to the first direction, and a displacement amount of the optical axis of the second lens in the second direction with respect to the optical axis of the first lens is no greater than an arrangement pitch of the pixels in the second direction.

7. The compound eye camera module according to claim 1, wherein pixels in the plurality of imaging regions are arranged in a matrix in a first direction and a second direction orthogonal to each other, the lens module has at least first to fourth lenses arranged in a lattice point shape, each of a direction connecting an optical axis of the first lens to the optical axis of the third lens and a direction connecting an optical axis of the second lens to an optical axis of the fourth lens makes a smaller angle with the first direction than with the second direction, each of a direction connecting the optical axis of the first lens to the optical axis of the second lens and a direction connecting the optical axis of the third lens to the optical axis of the fourth lens makes a smaller angle with the second direction than with the first direction, and one or both of a displacement amount of the optical axis of the third lens in the second direction with respect to the optical axis of the first lens and a displacement amount of the optical axis of the fourth lens in the second direction with respect to the optical axis of the second lens is no greater than an arrangement pitch of the pixels in the second direction.

8. The compound eye camera module according to claim 1, wherein pixels in the plurality of imaging regions are arranged in a matrix in a first direction and a second direction orthogonal to each other, the lens module has at least first and second lenses, a direction connecting an optical axis of the first lens to an optical axis of the second lens makes a smaller angle with the first direction than with the second direction, and a displacement amount of the optical axis of the second lens in the second direction with respect to the optical axis of the first lens is no greater than an arrangement pitch of the pixels in the second direction.

\* \* \* \* \*